Sept. 29, 1964          H. W. ORR                3,151,061
            MONITOR FOR CONTROL OF LIQUID FOAMING
                    Filed Nov. 13, 1961
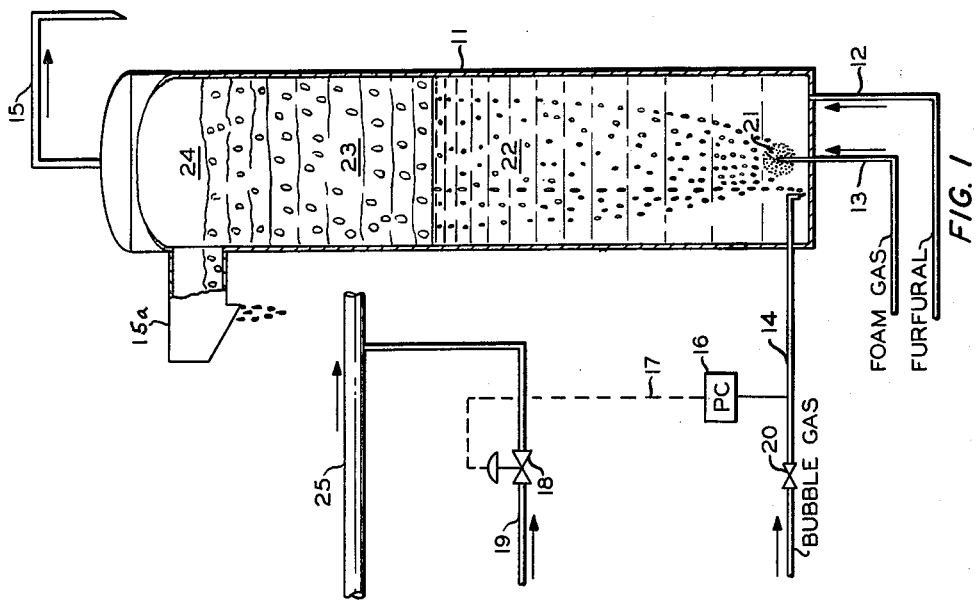
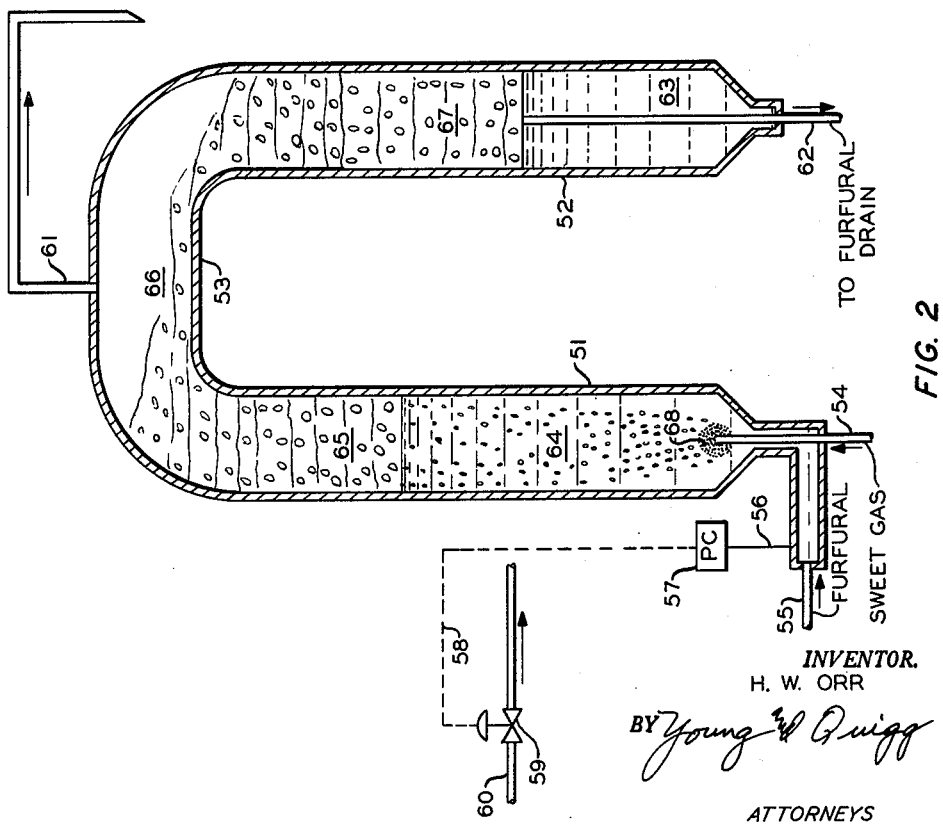
INVENTOR.
H. W. ORR
BY Young & Quigg
ATTORNEYS 3,151,061
MONITOR FOR CONTROL OF LIQUID FOAMING
Harold W. Orr, Borger, Tex., assignor to Phillips
Petroleum Company, a corporation of Delaware
Filed Nov. 13, 1961, Ser. No. 151,916
13 Claims. (Cl. 208—328)

This invention relates to control of foaming in chemical processing. In one aspect it relates to a method and apparatus for control of foaming of the liquid in process in response to the degree of foaming as sensed by monitoring or measuring the fluid pressure head of the foaming liquid.

In processing fluids, that is, liquids, vapors, or mixtures thereof, with selective solvents for separation of one or more constituents from one or more other constituents, the solvents frequently become difficult to process because of foaming. Foaming of mineral seal oil sometimes occurs in natural gasoline extraction plants. Also, foaming occurs in furfural employed as an extraction solvent in the separation and recovery of butadiene and of butenes from the effluent of catalytic dehydrogenation of butane. The butadiene separated in this manner is usually employed in the production of synthetic elastomers.

Upon continued use such extraction solvents frequently become contaminated with impurities, and some of these impurities are believed responsible for the foaming of the solvents.

An object of this invention is to provide a method and apparatus for determining the relative degree of foaming of liquids. Another object of this invention is to provide apparatus and a method for controlling foaming of liquids in process. Yet another object of this invention is to provide a method and apparatus for regulation of the addition of an antifoam agent to the liquid subject to foam-in response to the degree of foaming of the liquid. Still other objects and advantages of this invention will be realized upon reading the following description which, taken with the attached drawing, forms a part of this specification.

In the drawing, FIGURE 1 illustrates, in diagrammatic form, an elevational view, partly in section, of an apparatus suitable for carrying out a method of this invention. FIGURE 2 is an alternate embodiment of apparatus for carrying out a method of this invention.

In the drawing, particularly in FIGURE 1, reference numeral 11 identifies a vertically-positioned, elongated tubular member or vessel. This vessel has both of its ends closed. Conduits 12 and 13 communicate with the lower portion of the vessel while conduit 15 leads from the top of the vessel. Another conduit 14 is positioned as illustrated and this conduit terminates inside vessel 11 with the actual end of the conduit pointing downward in the vessel. Conduit 14 is provided with a valve 20 for regulation of fluid flowing therethrough. A pressure controller 16 receives a pressure signal from conduit 14 and the controller emits a pressure signal through tube 17 to a motor valve 18 which is adapted to regulate flow of a liquid through a conduit 19. Liquid passing through conduit 19 as controlled by valve 18 is added to a conduit 25, this conduit passing liquid in process, the foaming of which is to be controlled. Conduit 13 also terminates in the lower portion of vessel 11 and at its outlet end is fitted with a diffusion stone 21 of such character that a gas passing through tube or conduit 13 is distributed in vessel 11 as very fine bubbles. A liquid solvent passes through conduit 12 into vessel 11 and upon introduction of a gas through conduit 13 and diffusion stone 21 foam is formed in the vessel. Reference numeral 22 identifies a fluid in the lower portion of vessel 11 and this fluid is largely liquid. On top of liquid 22 is a layer of foam 23 and in the uppermost portion of the vessel is a space 24 occupied largely by gas.

In the operation of this embodiment of the invention, the liquid subject to foaming is passed at a low flow rate through conduit 12 into vessel 11. A gas unreactive chemically with the process liquid is passed through conduit 13 and is diffused by diffusion stone 21 with the result that foam is formed.

A gas, which can be the same gas as passed through conduit 13 or it can be another gas, provided it is also chemically inert with respect to the liquid being treated, is passed through conduit 14 into the lower portion of the vessel. This gas leaves the downwardly pointing outlet end of conduit 14 in the vessel merely as a small stream of bubbles and these bubbles then rise upward through the liquid in the vessel. The liquid flowing through conduit 12 and the gases flowing through conduits 13 and 14 are flowed into vessel 11 at predetermined and at relatively uniform flow rates. The gas flowing through conduit 14 in order to pass into vessel 11 is maintained under a pressure slightly greater than the pressure head of the several fluid phases in vessel 11.

In case the liquid foams voluminously in the presence of the foam gas added through diffusion stone 21, the layer of liquid in the lower portion of the vessel is relatively small while the layer of foam 23 upon this liquid will occupy the larger portion of the vessel. Thus, in this case, when the degree of foaming is great the pressure of the gas flowing through conduit 14 will be relatively small. In contrast, under conditions of a small degree of foaming of the liquid in vessel 11, the liquid layer will be relatively high in the vessel and the layer of foam relatively small. In this case, pressure required in conduit 14 for passage of the gas at a low flow rate into vessel 11 will be greater than in the aforementioned case. The pressure controller 16 is responsive to this change in pressure and this pressure controller emits a signal through conduit 17 in response to pressure in conduit 14 for operation of motor valve 18. This control apparatus is set so that a lower pressure sensed by pressure controller 16 actuates motor valve 18 to add a larger quantity of antifoam agent through valve 18 and conduit 19 into the liquid in process flowing through conduit 25. When the pressure head indicated by controller 16 is greater as a result of a greater pressure required in conduit 14 for introduction of bubble gas into the column, the signal emitted from controller 16 throttles the motor valve 18 for admission of a smaller amount or flow rate of antifoam agent to conduit 19 into the material in process flowing through conduit 25.

An antifoam material or agent suitable for use in the control method described herein is a polydimethylsiloxane, called Dow-Corning antifoam A. This material is described in U.S. Patent 2,748,180. This polydimethylsiloxane antifoam agent is a liquid and is flowed through conduit 19 as regulated by motor valve 18.

When the liquid to which the antifoam agent is added is a mineral seal oil solvent or absorbent used in a natural gasoline extraction plant, the mineral seal oil flows through conduit 25 and receives its antifoam agent from conduit 19 with the mixture passing on to an absorption column in which natural gas is treated by the absorbent for extraction of the condensable or gasoline boiling range hydrocarbons. In such a case it is preferable to employ either the natural gas prior to extraction with the mineral seal oil solvent or after extraction with the mineral seal oil solvent as the foam-forming gas in conduit 13 and also as the bubble-forming gas in conduit 14. However, if desired, the gases flowing through conduits 13 and 14 can be other gases providing they are inert to the liquid in process. If desired, the antifoam agent can be added to the rich oil en route to the stripping still.

In the embodiment of apparatus illustrated in FIGURE 2, the general outline of apparatus is substantially the same as that in FIGURE 1. In FIGURE 2, a vertical column 51 is provided in the foam-forming and pressure-indicating portion of the apparatus. In the lower portion of conduit 51 is provided an inlet tube 54 for passage of the foam-forming gas. The inner end of conduit 54 is fitted with a diffusion stone 68 for breaking up the gas into fine bubbles suitable for foaming foam. A side arm arrangement is provided with a conduit 55 for inlet at a constant or predetermined flow rate of the liquid, the foaming of which is to be sensed. A conduit 56 leads to a pressure controller 57. Pressure controller 57 emits a signal responsive to the pressure of liquid entering the apparatus from conduit 55 through a conduit or tube 58 to a motor valve 59 which regulates the rate of flow of an antifoam agent flowing through conduit 60. This conduit 60 is attached to a conduit corresponding to conduit 25 of FIGURE 1 in which the selective solvent or liquid to be treated for foaming is passed. A conduit 61 is provided as an outlet conduit from the top of this apparatus for passage of gas separated from liquid and foam to the atmosphere. Reference numeral 64 identifies a body of fluid in the lower portion of leg 51 of the apparatus, this fluid being largely liquid. Floating on top of liquid 64 is a layer of foam 65. If the foam 65 breaks into liquid and gas with difficulty the foam enters the upper portion of leg 51 and flows through the horizontal tube portion 53 and downward into leg 52. Ample time is provided by the volume of leg 52 so that the liquid can be separated from gas or the foam. Thus, in leg 52 reference numeral 63 identifies the layer of liquid while the foam being broken into liquid and gas is identified by reference numeral 67. A tube 62 is provided for overflow or outlet of the liquid accumulating as layer 63. While the positioning of the upper end of tube 62 in leg 52 defines a level of the body of liquid 63, foam can also pass from layer 67 through the tube 62.

This apparatus of FIGURE 2 operates in substantially the same manner as described above for the apparatus of FIGURE 1. The liquid subject to foaming, such as furfural, is passed at a low and uniform rate through conduit 55 into the lower portion of leg 51. A gas such as a hydrocarbon gas or other gas which is chemically inert with the furfural is passed at a uniform rate through conduit 54 and the diffusion stone 68. The gas from tube 54 is dispersed into fine bubbles in the furfural, foam is formed and this foam rises and accumulates on the surface of liquid 64 as a layer 65. When foaming is serious, that is, when the liquid being treated foams very easily, the layer of liquid 64 in leg 51 will be small and the pressure sensed by pressure controller 57 will be relatively small. In this case, a signal is emitted from controller 57 to open motor valve 59 for addition of a larger amount of antifoam agent to the liquid in process. In the reverse manner, when the liquid being treated foams with less ease the layer of liquid 64 will be deeper in leg 51 and the amout of foam on the surface of the liquid 64 will be less and under these conditions the pressure signal passing through tube 56 will be greater and the pressure controller will emit a signal for throttling motor valve 59 for the addition of a smaller amount of antifoam agent.

While the embodiments of apparatus illustrated in FIGURES 1 and 2 can be employed at atmospheric temperature or room temperature, it may be preferable in some instances to carry out this control under conditions as nearly as possible like those in the plant in which the liquid foaming causes difficulty. Thus, for example, in an absorber operated between 90° and 100° F., the temperature in the pieces of apparatus of FIGURES 1 and 2 may be held within the same temperature range. If, however, the foaming of the liquid in process is more serious, as in a stripping still, which may operate at, for example, in the range of 200° to 300° F., then temperatures in the foam sensing apparatus should preferably be maintained in this range.

In one instance, an apparatus similar to that illustrated in FIGURE 1 is made of a 20 to 30-inch long piece of 1½ to 2-inch inside diameter pipe. The diffusion stone is placed as near the bottom end of the pipe as possible and is supplied with a regulated flow of gas, such as a hydrocarbon gas. A regulated, relatively constant flow of furfural is introduced into the pipe at a point near its bottom and allowed to overflow at a level near the top of the pipe. A tap is made near the bottom of the pipe for insertion of a tube leading therefrom to a pressure controller apparatus. The complete unit is preferably insulated and is heated by a thermostated arrangement to maintain about the same temperature inside this apparatus as in the plant apparatus in which foaming troubles occur. The pressure of the column of fluid in the pipe is detected by such a pressure transmitter as a Taylor Model 339F5 (Taylor Instrument Co.) with a signal therefrom being magnified for passage to a conventional pressure controller.

For use with a laboratory apparatus, which is not connected to the plant for indication and control, the pressure transmitter output can be recorded on any pneumatic recorder and calibrated to indicate inches of foam. Then, after several determinations of inches of foam of different values and the addition of different amounts of antifoam agent, a calibration curve can be obtained for use in subsequent plant control.

In one furfural absorber column the column foam or froth was greatest about one-third of the way up the top section. Thus, in this case, it is advisable to withdraw a small sample of the absorbent in process at this elevation in the column for testing in the apparatus of this invention for foam control.

According to this invention, it is not necessary that the liquid in leg 51 or in column 11 form a definite interface between the liquid and the supernatant foam since it is merely necessary to sense the static pressure in the column. This sensing of static pressure merely gives the weight of fluid in the column and when this weight is greater the indication is that there is more liquid in the column and less foam and, vice versa, upon sensing a lighter weight of fluid in the column the indication is that there is more foam and less liquid.

While I have discussed the application of the method and apparatus of this invention for use with mineral seal oil as an absorbent and with furfural as an absorbent, it will be realized that the application of this invention is not limited thereto.

While certain embodiments of the invention have been described for illustrative purposes, the invention obviously is not limited thereto.

This invention has a broad application and it can be used, in general, in processes in which antifoam agents are effective in reducing foaming. For example, in absorption plants using mineral seal oil as the absorbent, foaming may occur in the absorber, in the stripper, or in subsequent processing steps in which the stripped material is fractionated. In such a case material from the subsequent processing step is introduced into the apparatus of FIGURE 1 via conduit 12, or into the apparatus of FIGURE 2 via conduit 55. In either case, upon sensing the fluid head in the foam testing apparatus, the antifoam agent can be added via conduit 19 or conduit 60 to any desired process point upstream from the point from which the material in process was taken. The point of addition can, for example, be to the lean absorbent, to any desired tray in the absorber, to the rich absorbent, to any process point in the stripping still or to the stripped material enroute to the subsequent processing step.

While reference numeral 63 of FIGURE 2 identifies a layer of liquid accumulated in the bottom of leg 52, the space occupied by this liquid also serves as a trap for accumulation of solids, such as scale or other solid material, to prevent plugging of conduit 62.

Conduit 15a in FIGURE 1 is for outlet of foam or for outlet of liquid whichever material fills the tubular member 11 up to the level of this conduit.

Alternately, a bubble gas tube similar to tube 14 of FIGURE 1 can be used in conjunction with FIGURE 2, in which case conduit 56 can then be connected with the bubble gas tube. Also, the tube 56 of FIGURE 2 can be connected with the lower portion of leg 51 as well as to the arm to which it is shown connected.

That which is claimed is:

1. A method for determining the degree of foaming of a liquid having foaming propensities, comprising the steps of:
   (1) introducing a stream of said liquid at a uniform rate into a lower section of an enclosed foaming zone;
   (2) simultaneously introducing a stream of a gas inert to said liquid at a lower level of said zone at a uniform rate so as to bubble said gas up through said liquid and form foam;
   (3) overflowing fluid from an upper section of said foaming zone; and
   (4) measuring the pressure head of fluid in said zone adjacent said level as a measure of the degree of foaming of said liquid.

2. In a process wherein a stream of process liquid is continuously passed to a processing zone, at least one other material including a foam-producing agent is admixed therewith in said zone and absorbed by said liquid, and the resulting liquid is recovered and recycled to said processing zone, the improvement comprising the steps of:
   (1) passing a sample stream of the recovered liquid at a uniform rate to a foaming zone;
   (2) simultaneously bubbling a stream of a gas inert to said recovered liquid into a lower level of said foaming zone so as to form foam on the liquid therein;
   (3) overflowing fluid from an upper section of said foaming zone;
   (4) measuring the pressure head of fluid in said foaming zone at said lower level; and
   (5) injecting an antifoaming agent into said stream of process liquid at a controlled rate, increasing the rate as said head decreases and decreasing the rate as said head increases.

3. The process of claim 2 wherein said processing zone is a hydrocarbon absorption zone using furfural as a selective solvent and as said process liquid.

4. The process of claim 2 wherein said processing zone is a natural gas processing zone and said process liquid is a mineral seal oil.

5. The process of claim 1 wherein said liquid is furfural from a hydrocarbon extraction process.

6. The process of claim 1 wherein said liquid is a mineral seal oil from a hydrocarbon extraction process.

7. The process of claim 1 wherein said fluid pressure head is measured by bubbling a gas inert to the fluid in said zone slowly through said zone from a lower level therein at a uniform rate and sensing the pressure required to pass last said gas into said zone at said rate.

8. The process of claim 2 wherein said pressure head of fluid is measured by bubbling a gas inert to the fluid in said zone slowly through said zone from a lower level therein at a uniform rate and sensing the pressure required to pass last said gas into said zone at said rate.

9. Apparatus for measuring the foaming propensity of a liquid comprising in combination:
   (1) an upright tubular vessel having a closed inlet end and a closed outlet end, said inlet end being in a lower section thereof;
   (2) an outlet for fluids on said outlet end;
   (3) an inlet for said liquid in said inlet end;
   (4) an inlet for a foam-producing gas in said inlet end;
   (5) pressure sensing means communicating with the liquid in said vessel at a level adjacent said inlet end for sensing fluid pressure at said level; and
   (6) gas diffusion means in said vessel adjacent said inlet end communicating with said inlet for foam-producing gas.

10. The apparatus of claim 9 wherein element (5) comprises an inlet adjacent said inlet end for a bubble gas, a gas supply line connected with said inlet, and a pressure-sensing element connected with said supply line.

11. The apparatus of claim 10 including a main solvent feed line for an extraction process having a motor valve therein, said pressure-sensing means being a pressure-controller operatively connected with said valve.

12. A method for controlling the addition of an antifoam agent to a stream of furfural employed as a selective solvent in the separation of hydrocarbons in an extraction zone, comprising introducing a stream of said furfural into a foaming zone at a uniform rate, introducing a hydrocarbon gas nonreactive with furfural at a uniform rate into the lower portion of said furfural in said foaming zone under conditions to form foam, simultaneously bubbling a hydrocarbon gas nonreactive with furfural into the furfural in said foaming zone at a lower level therein, measuring the pressure of this last mentioned hydrocarbon gas required to bubble same into said furfural, flowing a main stream of furfural as the above mentioned selective solvent, adding an antifoam agent to said main stream of furfural and controlling the rate of addition of said antifoam agent to said main stream of furfural in response to the measured pressure of hydrocarbon gas required to bubble into said furfural by increasing said rate when said pressure decreases and decreasing said rate when said pressure increases.

13. A method for controlling the addition of an antifoam agent to a stream of mineral seal oil employed as a selective solvent in the separation of hydrocarbons in an extraction zone, comprising introducing a stream of said mineral seal oil into a foaming zone at a uniform rate, introducing a hydrocarbon gas nonreactive with mineral seal oil into the lower portion of said mineral seal oil at a uniform rate in said foaming zone under conditions to form foam, simultaneously bubbling a hydrocarbon gas nonreactive with mineral seal oil into the mineral seal oil in said foaming zone at a lower level therein, measuring the pressure of this last mentioned hydrocarbon gas required to bubble same into said mineral seal oil, flowing a main stream of mineral seal oil as the above mentioned selective solvent, adding an antifoam agent to said main stream of mineral seal oil and controlling the rate of addition of said antifoam agent to said main stream of mineral seal oil in response to the measured pressure of hydrocarbon gas required to bubble into said mineral seal oil by increasing said rate when said presure decreases and decreasing said rate when said pressure increases.

References Cited in the file of this patent

UNITED STATES PATENTS

| | | |
|---|---|---|
| 1,866,296 | Christmann | July 5, 1932 |
| 2,315,983 | Ross et al. | Apr. 6, 1943 |
| 2,433,030 | Cone | Dec. 23, 1947 |
| 2,449,427 | Thodos et al. | Sept. 14, 1948 |
| 2,981,693 | Browne et al. | Apr. 25, 1961 |
| 2,987,912 | Jacobson | June 13, 1961 |